US012671250B2

(12) United States Patent
Hanaoka et al.

(10) Patent No.: US 12,671,250 B2
(45) Date of Patent: Jun. 30, 2026

(54) CONTROL APPARATUS, CONTROL METHOD, AND PROGRAM FOR SUPPRESSING OSCILLATION IN A DC POWER SUPPLY SYSTEM

(71) Applicant: NTT, Inc., Tokyo (JP)

(72) Inventors: Naoki Hanaoka, Tokyo (JP); Toru Tanaka, Tokyo (JP); Naomichi Nakamura, Tokyo (JP); Yuji Higuchi, Tokyo (JP)

(73) Assignee: NTT, Inc., Tokyo (JP)

( * ) Notice: Subject to any disclaimer, the term of this patent is extended or adjusted under 35 U.S.C. 154(b) by 22 days.

(21) Appl. No.: 18/834,039

(22) PCT Filed: Mar. 18, 2022

(86) PCT No.: PCT/JP2022/012899
§ 371 (c)(1),
(2) Date: Jul. 29, 2024

(87) PCT Pub. No.: WO2023/175983
PCT Pub. Date: Sep. 21, 2023

(65) Prior Publication Data
US 2025/0125612 A1     Apr. 17, 2025

(51) Int. Cl.
*H02J 1/12* (2026.01)
*H02J 1/00* (2006.01)
H02M 7/757 (2006.01)
(52) U.S. Cl.
CPC .................. *H02J 1/12* (2013.01); *H02J 1/00* (2013.01); *H02M 7/7575* (2013.01)

(58) Field of Classification Search
CPC ............. H02J 1/12; H02J 1/00; H02M 7/7575
See application file for complete search history.

(56) References Cited

U.S. PATENT DOCUMENTS

2017/0311400 A1*  10/2017  Newman, Jr. .......... H05B 45/38
2019/0296553 A1*   9/2019  Tzimas ................... H02M 5/04

FOREIGN PATENT DOCUMENTS

JP        2006-129585        5/2006

OTHER PUBLICATIONS

Khazaei, J., Miao, Z., Piyasinghe, L., & Fan, L. (2015). Minimizing DC system loss in multi-terminal HVDC systems through adaptive droop control. Electric Power Systems Research, 126, 78-86. (Year: 2015).*

(Continued)

*Primary Examiner* — Daniel Cavallari
(74) *Attorney, Agent, or Firm* — IPUSA, PLLC

(57) ABSTRACT

There is provided a control apparatus that executes control for a DC power supply system in which a plurality of bases including at least a first base including a first power supply device and a second base including a second power supply device and a load device are connected by electrical supply lines, the control apparatus including: an information acquisition unit that acquires information about a bus between the second power supply device and the load device; a determination unit that determines whether to execute voltage control in the DC power supply system, based on the information and a threshold value; and a control unit that executes voltage control on at least one of the first power supply device and the second power supply device in a case where the determination unit determines to execute the control.

7 Claims, 8 Drawing Sheets

(56)            References Cited

OTHER PUBLICATIONS

Naoki Hanaoka et al., IEEJ2021 General Lecture 6-056 "Study on Short Circuit Protection of Outdoor DC Power Supply System" NTT Space Environment and Energy Research Institute, Mar. 9, 2021.

* cited by examiner

Fig. 1

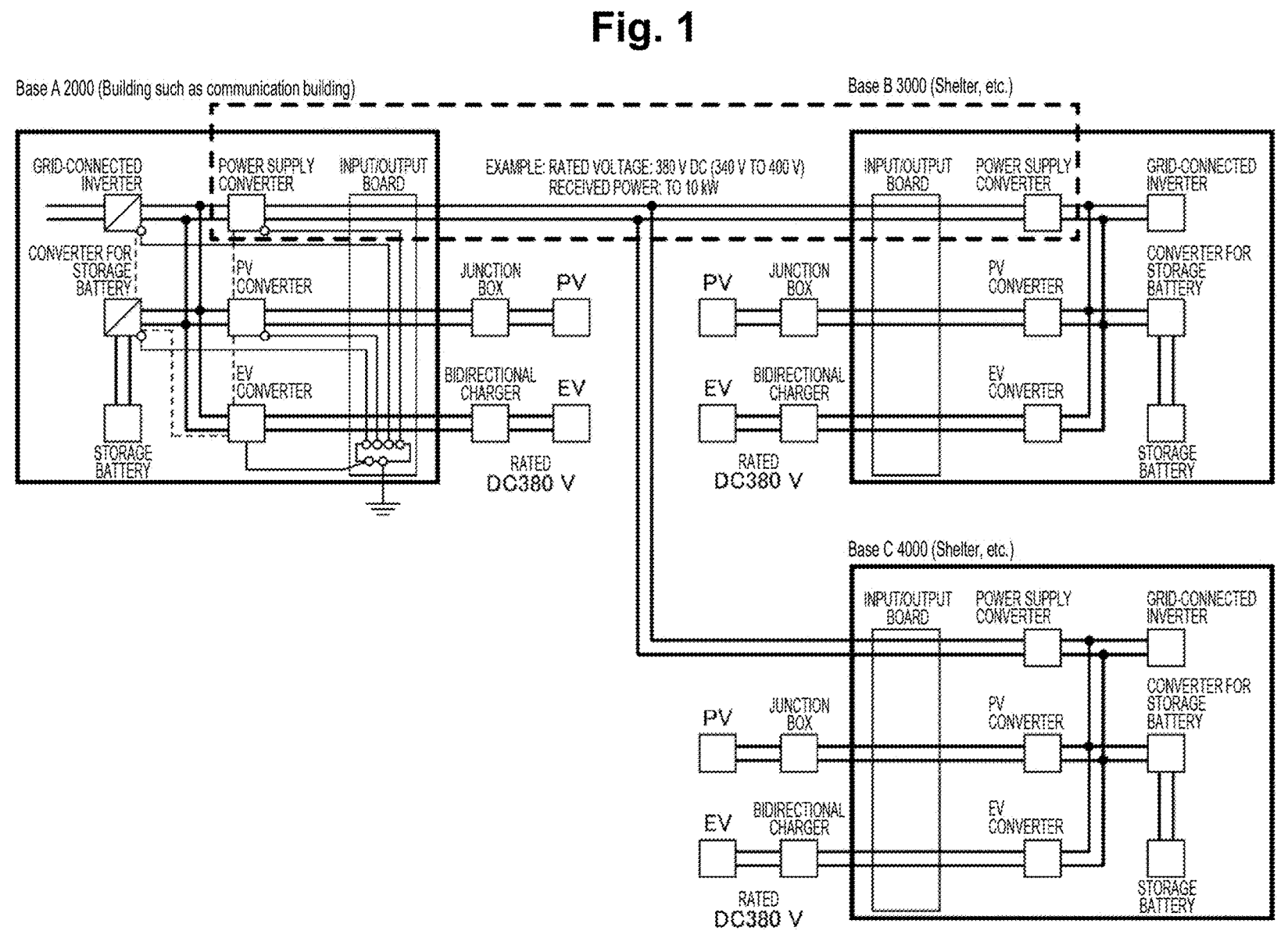

Base A 2000 (Building such as communication building)

GRID-CONNECTED INVERTER

CONVERTER FOR STORAGE BATTERY

POWER SUPPLY CONVERTER

PV CONVERTER

EV CONVERTER

INPUT/OUTPUT BOARD

STORAGE BATTERY

JUNCTION BOX

BIDIRECTIONAL CHARGER

PV

EV

RATED DC380 V

EXAMPLE: RATED VOLTAGE: 380 V DC (340 V TO 460 V) RECEIVED POWER TO 10 kW

Base B 3000 (Shelter, etc.)

GRID-CONNECTED INVERTER

CONVERTER FOR STORAGE BATTERY

STORAGE BATTERY

POWER SUPPLY CONVERTER

PV CONVERTER

EV CONVERTER

INPUT/OUTPUT BOARD

JUNCTION BOX

BIDIRECTIONAL CHARGER

PV

EV

RATED DC380 V

Base C 4000 (Shelter, etc.)

GRID-CONNECTED INVERTER

CONVERTER FOR STORAGE BATTERY

STORAGE BATTERY

POWER SUPPLY CONVERTER

PV CONVERTER

EV CONVERTER

INPUT/OUTPUT BOARD

JUNCTION BOX

BIDIRECTIONAL CHARGER

PV

EV

RATED DC380 V

| | V1 | V2 | V1-V2 | Ip CURRENT (PREDICTED VALUE) | Ie LOAD CONSUMPTION CURRENT (ACTUAL) |
|---|---|---|---|---|---|
| NORMAL 1 | 380 V | 360 V | 20 V | 4 A | 4 A |
| NORMAL 2 | 380 V | 350 V | 30 V | 6 A | 6 A |
| ANOMALY (OSCILLATION) | 380 V | 350 V | 30 V | 6 A | 5 A |

Fig. 8

CONTROL APPARATUS, CONTROL METHOD, AND PROGRAM FOR SUPPRESSING OSCILLATION IN A DC POWER SUPPLY SYSTEM

TECHNICAL FIELD

The present invention relates to a technology for ensuring stability of power supply.

BACKGROUND ART

In communication buildings, data centers, and the like, high-voltage DC power supply systems have been introduced for the purpose of reducing power losses in the entire system and achieving energy saving. A DC power supply system supplies (distributes) power at a high voltage such as 380 V, for example.

In conventional DC power supply systems, indoor power supply is generally performed. In indoor DC power supply systems, power is supplied by a cable of about 60 m at the maximum. In addition, a power supply direction is one direction to a load such as an ICT device or the like.

CITATION LIST

Non Patent Literature

Non Patent Literature 1: IEEJ2021 General Lecture 6-056 "Study on Short Circuit Protection of Outdoor DC Power Supply System" by Hanaoka et al.

SUMMARY OF INVENTION

Technical Problem

In the future, it is assumed that an outdoor DC power supply system that supplies DC power by using an outdoor electrical supply line will be introduced (for example, Non Patent Literature 1). In addition, a mode is assumed in which a plurality of bases having power supply converters are connected in an n-to-n relationship, and bidirectional power supply is performed between the bases.

In the outdoor DC power supply system, power supply may be performed to a load located several kilometers away (for example, up to 4 km). In this case, the impedance (resistance component and inductance component) becomes very high compared to a conventional indoor DC power supply system.

In the situation where a plurality of bases having power supply converters are connected in an n-to-n relationship, and power interchange is performed between the bases, a problem arises in that the current and the voltage oscillate and power supply cannot be stably performed in some cases.

The present invention has been made in view of the problem described above, and an object of the present invention is to provide a technology for stably performing power supply in a DC power supply system in which a plurality of bases are connected by an electrical supply line.

Solution to Problem

According to a technology of the disclosure, there is provided a control device that executes control for a DC power supply system in which a plurality of bases including at least a first base including a first power supply device and a second base including a second power supply device and a load device are connected by electrical supply lines, the control device including:

an information acquisition unit that acquires information about a bus between the second power supply device and the load device;

a determination unit that determines whether to execute voltage control in the DC power supply system, based on the information and a threshold value; and a control unit that executes voltage control on at least one of the first power supply device and the second power supply device in a case where the determination unit determines to execute the control.

Advantageous Effects of Invention

According to the technology of the disclosure, power supply can be stably performed in a DC power supply system in which a plurality of bases are connected by electrical supply lines.

BRIEF DESCRIPTION OF DRAWINGS

FIG. 1 is a diagram illustrating an overall configuration example of a DC power supply system.

FIG. 3 is a diagram illustrating an example of a DC power supply system in which bases are connected by outdoor electrical supply lines.

FIG. 7 is a diagram for describing a specific example of determination.

FIG. 8 is a diagram illustrating a hardware configuration example of a device.

DESCRIPTION OF EMBODIMENTS

Embodiments of the present invention (present embodiments) will be described below with reference to the drawings. Each of the embodiments described below is merely an example, and embodiments to which the present invention is applied are not limited to the following embodiments.

(Overall Configuration Example of System)

FIG. 1 illustrates an overall configuration example of a DC power supply system according to the present embodiment. In the DC power supply system illustrated in FIG. 1, power is supplied over a long distance (for example, about 4 km) with high voltage (for example, 380 V) by an outdoor electrical supply line.

In the example of FIG. 1, there are three bases, that is, a base A 2000, a base B 3000, and a base C 4000, and each base includes a power supply converter and can supply power to the other buildings. That is, bidirectional power supply can be performed between any two bases of the three bases. In the example of FIG. 1, the base A 2000 is a building such as a communication building, and the base B 3000 and the base C 4000 are respective buildings such as shelters. The power supply converter may be referred to as a power supply device. However, the "power supply device" is not limited to the power supply converter.

As illustrated in FIG. 1, each base includes a power generation facility such as a solar power generator (PV) or a wind power generation and a load such as an EV and a storage battery and can perform power interchange between the bases bidirectionally by a converter.

Problems and Solutions

Figure 2:
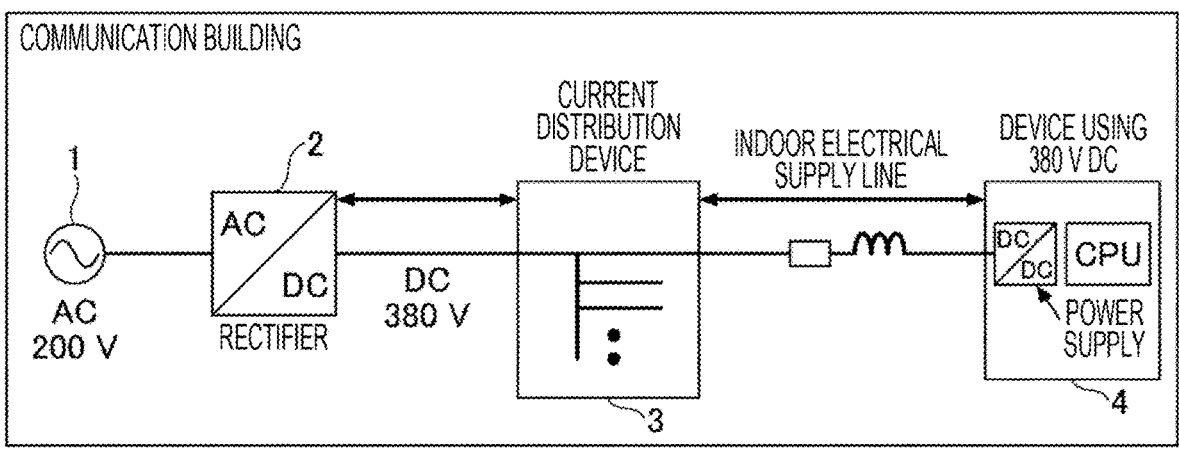
FIG. 2 is a diagram illustrating an example of a DC power supply system in one building.

Hereinafter, problems to be solved by the technology according to the present invention will be described in detail. First, for comparison, FIG. 2 illustrates an example of a conventional indoor (in a communication building) DC power supply system. As illustrated in FIG. 2, the DC power supply system includes a 200 V AC 1, a rectifier 2, a current distribution device 3, and a load 4 (a device using 380 V DC).

As illustrated in FIG. 2, unidirectional power supply from the rectifier 2 to the load 4 is performed by a cable of about 60 m at the maximum. Therefore, power can be stably transmitted to the load 4 such as an ICT device.

Figure 3:
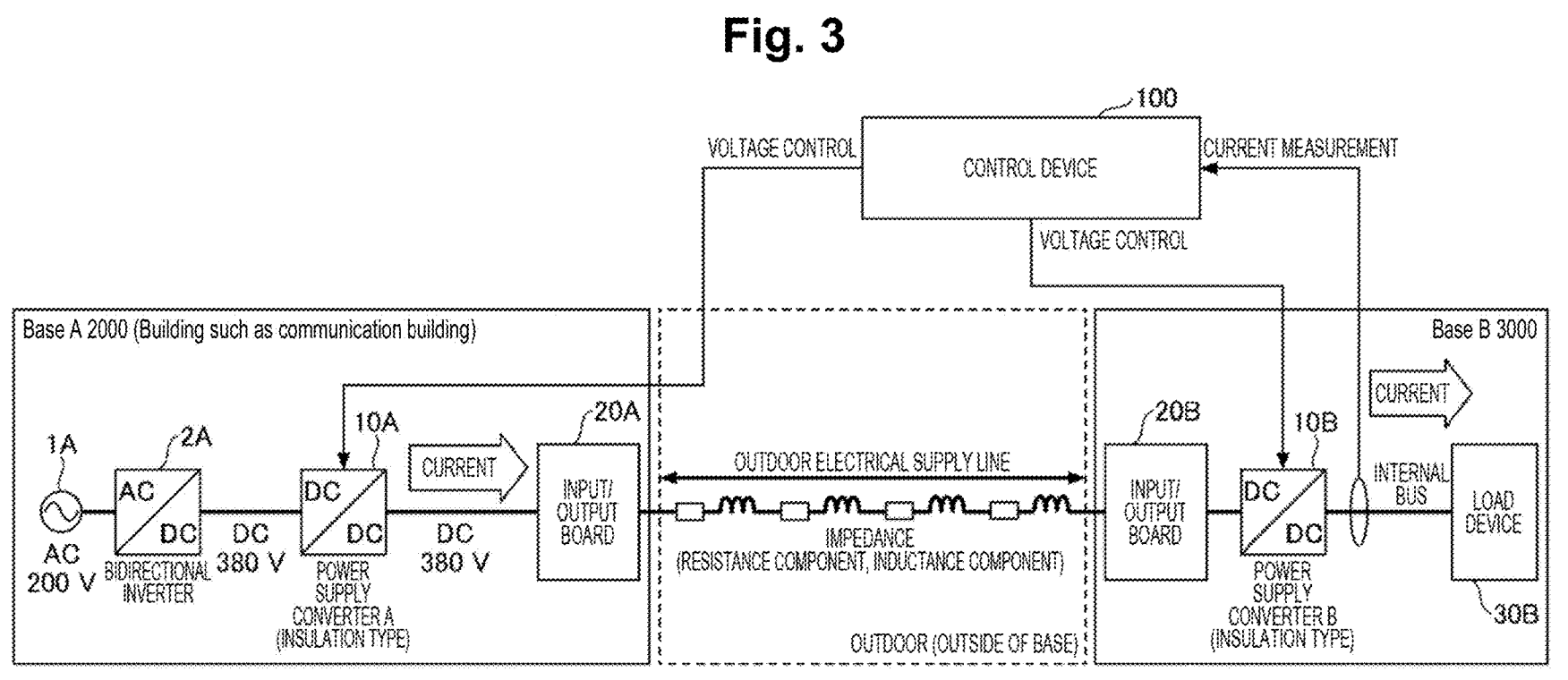

FIG. 3 illustrates a DC power supply system corresponding to a portion of a box surrounded by a dotted line in FIG. 1. As illustrated in FIG. 3, the base A 2000 (communication building) includes a 200 V AC power supply 1A, a bidirectional inverter 2A, a power supply converter A (10A), and an input/output board 20A. In addition, the base B 3000 includes an input/output board 20B, a power supply converter 10B, and a load device 30B.

The base A 2000 and the base B 3000 are connected by an outdoor electrical supply line capable of performing bidirectional power supply, and a length thereof is, for example, 4 km at the maximum.

In a case where power is supplied over a long distance as in the configuration of FIG. 3, the impedance (resistance component and inductance component) is about two orders of a magnitude larger than the impedance in the configuration illustrated in FIG. 2.

A problem arising in the long-distance power supply as described above will be described. FIG. 3 illustrates a control device 100 (control apparatus) that performs control to solve the problem. First, a problem that arises in a case where the control device 100 is not provided will be described.

In the present embodiment, as a control method of a power supply converter for performing power interchange between bases, a method in which an amount of power interchange is determined by a difference in input/output voltage between power supply converters of two bases that perform the power interchange (droop control system) is used.

In the configuration illustrated in FIG. 3, when load power that is power to a load device 30B of the base B 3000 decreases, a voltage of an internal bus (voltage of the internal bus between the power supply converter 10B and the load device 30B) increases. Therefore, a power supply converter B performs control to restore (lower) the voltage. Repetition of such an operation causes the voltage and the current of the internal bus to oscillate, and a problem arises in that stable power supply cannot be performed.

In order to solve the above-described problem, in the present embodiment, the control device 100 is provided. In addition, it is assumed that a sensor capable of measuring a current, a voltage, or both of a current and a voltage is provided in the internal bus of the base B 3000. Note that the control device 100 may be provided anywhere. For example, the control device 100 may be provided outside the base B 3000.

The control device 100 acquires a current value (actually measured value) of the internal bus in the base B 3000 from the sensor and adjusts at least one of a voltage V1 of the power supply converter 10A and a voltage V2 of the power supply converter 10B, based on the acquired current value and a predicted current value. Consequently, increase in the internal bus voltage can be suppressed, and the power supply can be stabilized. Note that V1 is a target voltage on a self-contained line side of a power supply converter 10A, and V2 is a target voltage on a self-contained line side of the power supply converter 10B. For example, in a case where a target value V1 is 380 V, and a target value V2 is 360 V, the voltage of the outdoor electrical supply line becomes 370 V as an average of V1 and V2. The self-contained line side is an outdoor electrical supply line side.

In the above-described example, the control is performed based on a current value (actually measured value) of the internal bus; however, the control may be performed based on a voltage value (actually measured value) of the internal bus.

(Configuration of Control Device 100)

Figure 4:
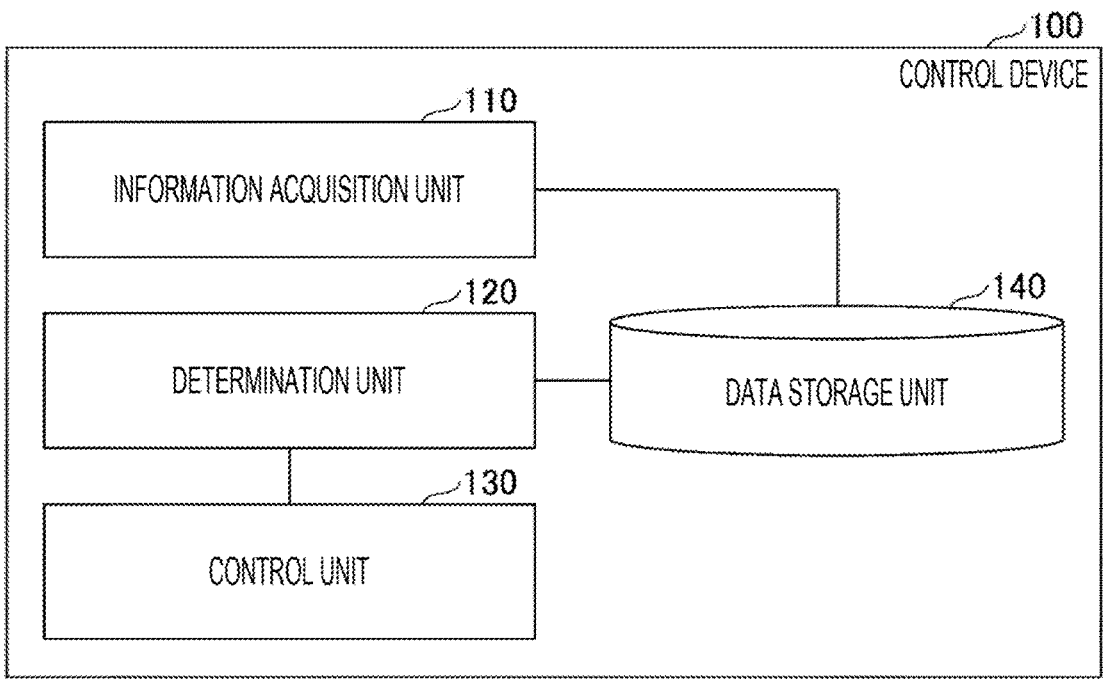
FIG. 4 is a diagram illustrating a configuration example of a control device.

FIG. 4 illustrates a configuration example of the control device 100 according to the present embodiment. As illustrated in FIG. 4, the control device 100 includes an information acquisition unit 110, a determination unit 120, a control unit 130, and a data storage unit 140. An operation outline of each unit is as follows.

The information acquisition unit 110 acquires a current value or a voltage value of the internal bus in a base where the load device is provided. The determination unit 120 determines whether to control the voltage to the power supply converter on the basis of the information acquired by the information acquisition unit 110 and the information (threshold value or the like) stored in the data storage unit 140.

The control unit 130 controls the voltage to the power supply converter in a case where the determination unit 120 determines to control the voltage to the power supply converter. The control may be control for any one power supply converter of the power supply converter of a power supply source and the power supply converter of a power supply destination.

The data storage unit 140 stores a set value of a current voltage of each of the power supply converter of the power supply source and the power supply converter of the power supply destination, and a threshold value.

(Operation Example of Control Device 100)

Subsequently, an operation example of the control device 100 will be described with reference to a procedure of the flowchart illustrated in FIG. 5. Here, an operation example of control for the DC power supply system illustrated in FIG. 3 will be described. In the configuration illustrated in FIG. 3, power is supplied from the power supply converter 10A of the building A to the power supply converter 10B of the building B via the outdoor electrical supply line, and power is supplied from the power supply converter 10B to the load device 30B via the internal bus. Basically (theoretically), a magnitude of a current supplied from the power supply converter B to the load device 30B is determined by the difference between the voltage of the power supply converter 10A and the voltage of the power supply converter B.

In S101, the information acquisition unit 110 acquires an actual value (actually measured value) of a current flowing via the internal bus from the sensor attached to the internal bus of the building B.

In S102, the determination unit 120 determines whether to control the voltage of the power supply converter 10A/10B by using the current value acquired in S101. The voltage of the power supply converter 10A/10B means "the voltage of the power supply converter 10A", "the voltage of the power supply converter 10B", or "both the voltage of the power supply converter 10A and the voltage of the power supply converter 10B". Processing details of the detailed determination are as follows.

The determination unit 120 reads a current set value (denoted as V1) of the voltage of the power supply converter 10A and a current set value (denoted as V2) of the voltage of the power supply converter 10B from the data storage unit 140. The determination unit 120 calculates V1–V2 and predicts a current value flowing via the internal bus from V1–V2.

Figure 6:
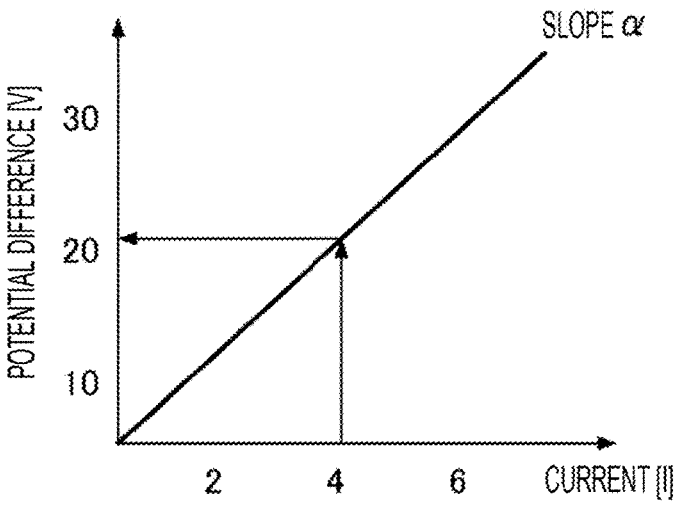
FIG. 6 is a diagram illustrating a relationship between a current and a potential difference.

For example, regarding the internal bus, as illustrated in FIG. 6, a relationship between a potential difference ("V1–V2") and a current value is prepared in advance, and a slope $\alpha$ thereof is stored in the data storage unit 140. The determination unit 120 can read $\alpha$ from the data storage unit 140 and calculate a predicted value of the current flowing via the internal bus by $(V1-V2) \times (1/\alpha)$.

The determination unit 120 compares the predicted value with the actually measured value and determines to control (adjust) the voltage of the power supply converter 10A/10B, for example, in a case where |predicted value–actually measured value| is larger than a threshold value.

A specific example will be described with reference to FIG. 7. In the example of FIG. 7, $\alpha=5$ (V/A) is defined. In addition, the predicted value of the current is represented by Ip, and the actually measured value is represented by Ie. In a case of Normal 1, since V1=380 V, and V2=360 V are defined, Ip=20×(1/5)=4 A is defined. Since Ie=4 A is defined and Ie is equal to Ip, the determination unit 120 determines not to perform the control. In a case of Normal 2, since V1=380 V, and V2=350 V are defined, Ip=30×(1/5)=6 A is defined. Since Ie=6 A is defined and Ie is equal to Ip, the determination unit 120 determines not to perform the control.

In a case of an anomaly (oscillation), since V1=380 V, and V2=350 V are defined, Ip=30×(1/5)=6 A is defined. On the other hand, Ie=5 A is defined, and Ip is larger than Ie by 1 A. Here, for example, it is assumed that the threshold value to be compared with |predicted value–actually measured value| is 0.5 A. In this case, |predicted value–actually measured value|>0.5 A, and thus the determination unit 120 determines to execute the control of the voltage of the power supply converter 10A/10B.

Figure 5:
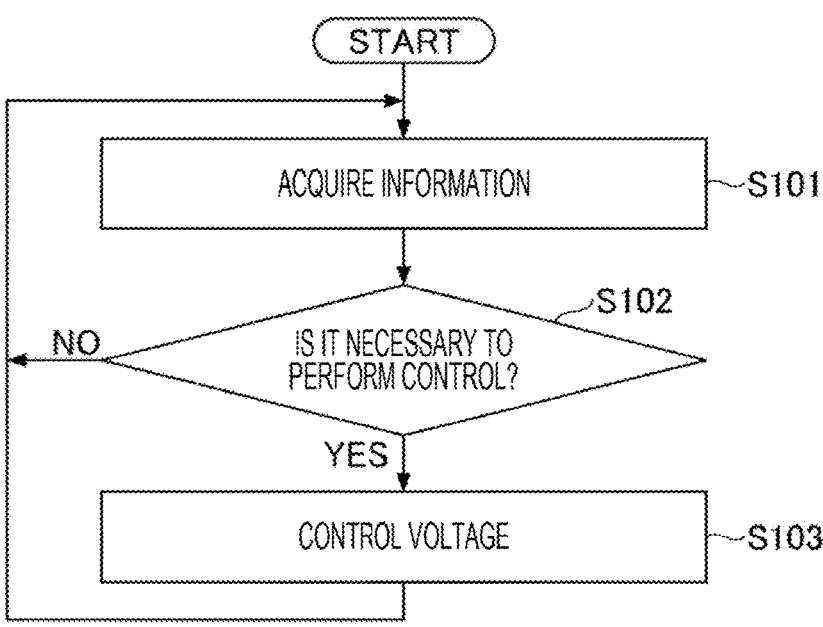
FIG. 5 is a flowchart for describing an operation of the control device.

As described above, in a case where the determination unit determines that the control of the voltage of the power supply converter 10A/10B is to be executed, the control unit 130 executes the control in S103 of FIG. 5.

Specifically, the control unit 130 controls the voltage of the power supply converter 10A/10B so that |predicted value–actually measured value| becomes equal to or less than a threshold value. For example, when the threshold value is 0.5, the voltage of the power supply converter 10A/10B is adjusted so that (Ip–Ie)≤0.5 A is satisfied.

In the case of anomaly illustrated in FIG. 7, since (Ip–Ie)=6 A–5 A is defined, control is performed such that Ip is lowered by 1 A. From the relationship of FIG. 6, since calculation can be performed as (Ip–Ie)×x=(6 A–5 A)×5=5 V, here, control is performed such that V1–V2 is decreased by 5 V, for example, V2 is increased by 5 V. Specifically, the control unit 130 issues an instruction (setting) indicating that 380 V is set as the voltage value, to the power supply converter 10A, and issues an instruction (setting) indicating that 355 V is set as the voltage value, to the power supply converter 10B.

If the actually measured value is 5 A and there is no change, the predicted value becomes 5 A and is equal to the actually measured value by the above-described control. Hence, this means a normal state.

As illustrated in the flowchart of FIG. 5, it is possible to maintain a stable power supply state by repeating the above-described control at regular time intervals, for example.

In the above-described example, the control device 100 acquires the current value from the sensor of the internal bus to perform determination and control, but this is an example. The control device 100 may acquire a voltage value from a sensor of the internal bus to perform determination and control.

In this case, in S101 of the flowchart of FIG. 5, the information acquisition unit 110 acquires the voltage value (the voltage between a positive line and a negative line of the internal bus) from the sensor of the internal bus. In S102, the determination unit 120 compares the voltage value acquired in S101 with a predetermined threshold value and determines to perform control in a case where the voltage value is higher than the threshold value (for example, 390 V).

In S103 in the case of performing control, the control unit 130 performs control to increase the voltage of V2, for example, so that V1–V2 becomes small. A width for increasing the voltage (a width for decreasing V1–V2) may be determined in advance. By repeating the control at regular time intervals, for example, a stable power supply state can be maintained.

(Hardware Configuration Example of Device)

The control device 100 can be implemented by, for example, causing a computer to execute a program. This computer may be a physical computer, or may be a virtual machine on a cloud.

Specifically, the control device 100 can be implemented by executing a program corresponding to processing to be performed in the control device 100 using hardware resources such as a central processing unit (CPU) and a memory installed in the computer. The program is recorded in a computer-readable recording medium (such as a portable memory) so that the program can be stored and distributed. Furthermore, the program can also be provided via a network such as the Internet or an electronic mail.

Figure 8:
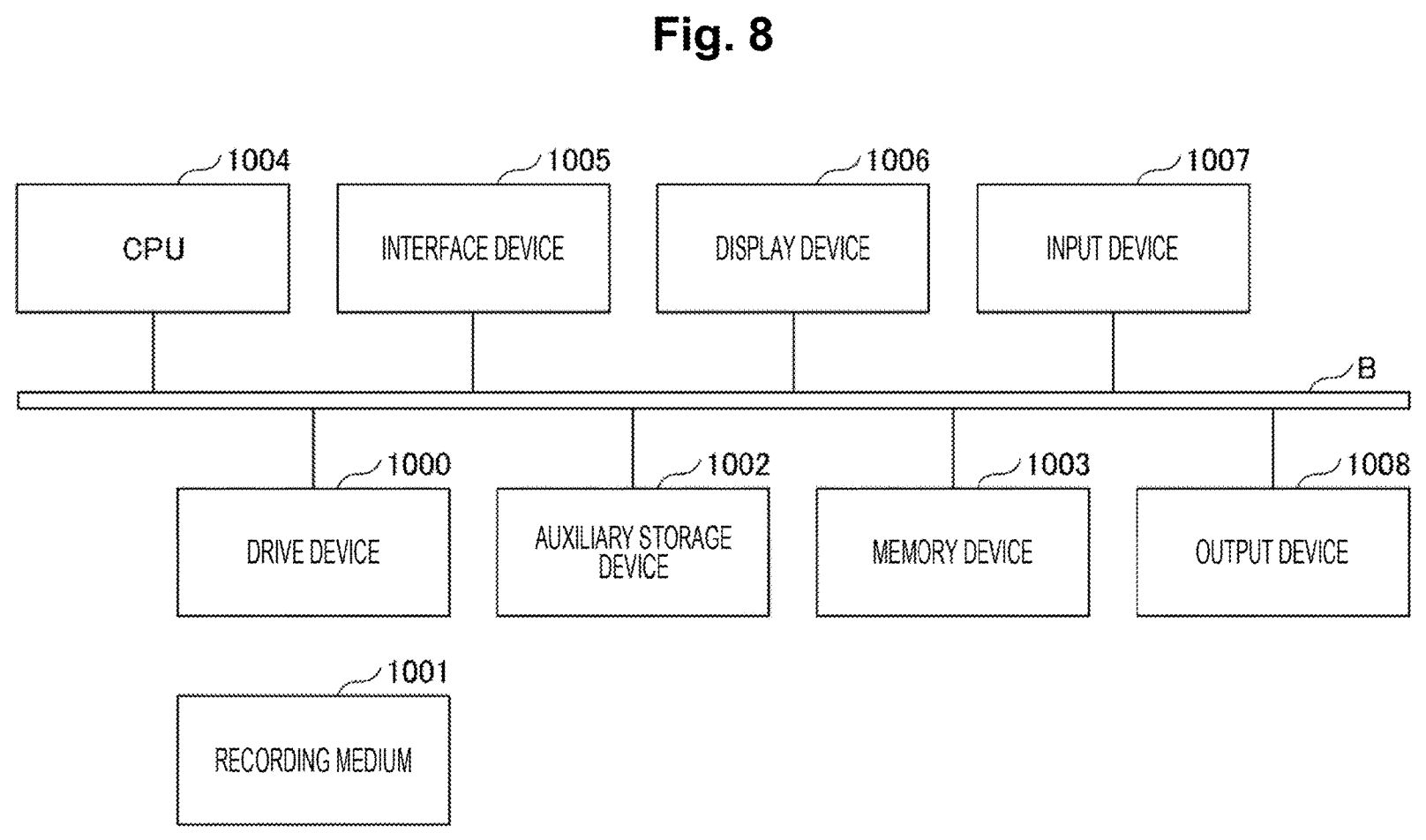

FIG. 8 is a diagram illustrating an example hardware configuration of the above computer. The computer in FIG. 8 includes a drive device 1000, an auxiliary storage device 1002, a memory device 1003, a CPU 1004, an interface device 1005, a display device 1006, an input device 1007, an output device 1008, and the like, which are connected to each other via a bus BS.

The program for implementing the processing in the computer is provided by, for example, a recording medium 1001 such as a CD-ROM or a memory card. When the recording medium 1001 storing the program is set in the drive device 1000, the program is installed on the auxiliary storage device 1002 from the recording medium 1001 via the drive device 1000. However, the program is not necessarily installed from the recording medium 1001, and may be downloaded from another computer via a network. The auxiliary storage device 1002 stores the installed program and also stores necessary files, data, and the like.

In a case where it is instructed to activate the program, the memory device 1003 reads and stores the program from the auxiliary storage device 1002. The CPU 1004 implements a function related to the control device 100 in accordance with the program stored in the memory device 1003. The interface device 1005 is used as an interface for connection to a network, various measurement devices, and the like. The display device 1006 displays a graphical user interface (GUI) or the like according to the program. The input device 1007 includes a keyboard and a mouse, buttons, a touchscreen, or the like, and is used to input various operation instructions. The output device 1008 outputs a calculation result.

Effects of Embodiments

According to the technology of the present embodiment, power supply can be stably performed in the DC power supply system in which a plurality of bases are connected by electrical supply lines. That is, it is possible to prevent an increase in voltage of the internal bus and stabilize power supply so that the voltage and the current of the internal bus do not oscillate.

Supplementary Notes

In the present specification, at least the control device, the control method, and the program in the following supplementary notes are disclosed.

Supplementary Note 1

A control device that executes control for a DC power supply system in which a plurality of bases including at least a first base including a first power supply device and a second base including a second power supply device and a load device are connected by electrical supply lines, the control device including:
  a memory; and
  at least one processor connected to the memory, in which the processor is configured to
  acquire information about a bus between the second power supply device and the load device,
  determine whether to execute voltage control in the DC power supply system, based on the information and a threshold value, and
  execute voltage control on at least one of the first power supply device and the second power supply device in a case of determination that the control is executed.

Supplementary Note 2

The control device according to Supplementary Note 1, in which
  the information is an actually measured value of a current flowing via the bus, and
  the processor calculates a predicted value of the current from a voltage of the first power supply device and a voltage of the second power supply device and compares a difference between the predicted value and the actually measured value with the threshold value to determine whether to execute the control.

Supplementary Note 3

The control device according to Supplementary Note 2, in which
  the processor executes voltage control on at least one of the first power supply device and the second power supply device such that the difference between the predicted value and the actually measured value is equal to or less than the threshold value.

Supplementary Note 4

The control device according to Supplementary Note 1, in which
  the information is an actually measured value of a voltage of the bus, and
  the processor determines whether to execute the control by comparing the actually measured value with the threshold value.

(Supplementary Note 5)
A control method in a computer that executes control for a DC power supply system in which a plurality of bases including at least a first base including a first power supply device and a second base including a second power supply device and a load device are connected by electrical supply lines, the control method including:
  an information acquiring step of acquiring information about a bus between the second power supply device and the load device;
  a determining step of determining whether to execute voltage control in the DC power supply system, based on the information and a threshold value; and
  a controlling step of executing voltage control on at least one of the first power supply device and the second power supply device in a case where, in the determining step, it is determined to execute the control.

Supplementary Note 6

A non-transitory storage medium storing a program for causing a computer to function as each unit in the control device according to any one of Supplementary Notes 1 to 4.

Although the present embodiments have been described above, the present invention is not limited to the specific embodiments, and various modifications and changes can be made within the scope of accompanying claims.

REFERENCE SIGNS LIST

100 Control device
110 Information acquisition unit
120 Determination unit
130 Control unit
140 Data storage unit
1000 Drive device
1001 Recording medium
1002 Auxiliary storage device
1003 Memory device
1004 CPU
1005 Interface device
1006 Display device
1007 Input device
1008 Output device

The invention claimed is:
1. A control apparatus that executes control for a DC power supply system in which a plurality of bases including at least a first base including a first power supply converter and a second base including a second power supply converter and a load device are connected by electrical supply lines, the control apparatus comprising:
  a processor; and
  a memory that includes instructions, which when executed, cause the processor to execute:

acquiring information about a bus between the second power supply converter and the load device;

determining whether the DC power supply system is in an unstable state in which a voltage or a current of the bus oscillates, based on the information and a threshold value; and executing voltage control on at least one of the first power supply converter and the second power supply converter to suppress the oscillation in a case where it is determined that the DC power supply system is in the unstable state.

2. The control apparatus according to claim 1, wherein the information is an actually measured value of a current flowing via the bus, and the determining includes calculating a predicted value of the current from a voltage of the first power supply converter and a voltage of the second power supply converter and comparing a difference between the predicted value and the actually measured value with the threshold value to determine whether to execute the control.

3. The control apparatus according to claim 2, wherein the executing of the voltage control includes executing voltage control on at least one of the first power supply converter and the second power supply converter such that the difference between the predicted value and the actually measured value is equal to or less than the threshold value.

4. The control apparatus according to claim 1, wherein the information is an actually measured value of a voltage of the bus, and the determining includes determining whether to execute the control by comparing the actually measured value with the threshold value.

5. A control method in a control apparatus that executes control for a DC power supply system in which a plurality of bases including at least a first base including a first power supply converter and a second base including a second power supply converter and a load device are connected by electrical supply lines, the control method comprising:

acquiring information about a bus between the second power supply converter and the load device;

determining whether the DC power supply system is in an unstable state in which a voltage or a current of the bus oscillates, based on the information and a threshold value; and executing voltage control on at least one of the first power supply converter and the second power supply converter to suppress the oscillation in a case where it is determined that the DC power supply system is in the unstable state.

6. A non-transitory computer-readable recording medium having computer-readable instructions stored thereon, which when executed, cause a computer including a memory and a processor to execute the control method according to claim 5.

7. A control apparatus that executes control for a DC power supply system in which a plurality of bases including at least a first base including a first power supply converter and a second base including a second power supply converter and a load device are connected by electrical supply lines, the control apparatus comprising:

a processor; and a memory that includes instructions, which when executed, cause the processor to execute:

acquiring information about a bus between the second power supply converter and the load device;

determining whether to execute voltage control in the DC power supply system, based on the information and a threshold value; and executing voltage control on at least one of the first power supply converter and the second power supply converter in a case where the control is determined to be executed, wherein the information is an actually measured value of a current flowing via the bus, and the determining includes calculating a predicted value of the current from a voltage of the first power supply converter and a voltage of the second power supply converter and comparing a difference between the predicted value and the actually measured value with the threshold value to determine whether to execute the control.

* * * * *